US011265105B2

(12) United States Patent
Xu et al.

(10) Patent No.: US 11,265,105 B2
(45) Date of Patent: Mar. 1, 2022

(54) TECHNIQUES FOR REDUNDANCY GENERATION OF POLAR CODES DURING WIRELESS COMMUNICATIONS

(71) Applicant: QUALCOMM Incorporated, San Diego, CA (US)

(72) Inventors: Changlong Xu, Beijing (CN); Jian Li, Beijing (CN); Jilei Hou, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 196 days.

(21) Appl. No.: 16/464,576

(22) PCT Filed: Jun. 2, 2017

(86) PCT No.: PCT/CN2017/086985
§ 371 (c)(1),
(2) Date: May 28, 2019

(87) PCT Pub. No.: WO2018/099027
PCT Pub. Date: Jun. 7, 2018

(65) Prior Publication Data
US 2021/0105087 A1   Apr. 8, 2021

(30) Foreign Application Priority Data
Nov. 30, 2016   (WO) ................ PCT/CN2016/107944

(51) Int. Cl.
H04L 1/00 (2006.01)
H04L 1/18 (2006.01)

(52) U.S. Cl.
CPC .......... H04L 1/0057 (2013.01); H04L 1/1812 (2013.01)

(58) Field of Classification Search
CPC ...... H03M 13/11; H03M 13/37; H03M 13/29; H04L 1/0057; H04L 1/1812;
(Continued)

(56) References Cited

U.S. PATENT DOCUMENTS 7,813,322 B2 * 10/2010 Laroia .................. H04L 1/0057
370/333
9,130,748 B2 * 9/2015 Bai ....................... H04L 1/0068
(Continued)

FOREIGN PATENT DOCUMENTS

CN       103281166 A    9/2013
CN       104124979 A   10/2014
(Continued)

OTHER PUBLICATIONS

Huawei et al., "HARQ Scheme for Polar Codes" 3GPP Draft, 3GPP TSG RAN WG1 Meeting #87, R1-1611255 HARQ Scheme for Polar Codes, 3rd Generation Partnership Project (3GPP), Mobile Competence Centre 650, Route Des Lucioles, F-06921 Sophia-Antipolis Cedex, France vol. RAN WG1, No. Reno, USA, Nov. 14, 2016-Nov. 18, 2016, Nov. 3, 2016 (Nov. 3, 2016), XP051189034, pp. 1-25, Retrieved from the Internet: URL:http://www.3gpp.org/ftp/tsg_ran/WG1_1/TSGR1_87/Docs/[retrieved on Nov. 3, 2016] Sections 1 and 2.2.
(Continued)

Primary Examiner — Hanh N Nguyen
(74) Attorney, Agent, or Firm — Arent Fox LLP

(57) ABSTRACT

Methods and apparatuses for wireless communications are described. In an aspect, a method and apparatus may include determining that a second transmission is decoded incorrectly in response to a first received indication on a communication channel. The method and apparatus may further include transmitting, on the communication channel, a third transmission and a fourth transmission based on a determination that the second transmission is decoded incorrectly, wherein the third transmission corresponds to a coded bit set of the third transmission including a first group of information bits of a coded bit set of a first transmission and a second group of information bits of a coded bit set of the second transmission and the fourth transmission corresponds to a
(Continued)

coded bit set of the fourth transmission including a combination of the coded bit sets of the first transmission, the second transmission, and the third transmission.

26 Claims, 7 Drawing Sheets

(58) Field of Classification Search
CPC ....... H04L 1/0041; H04L 1/18; H04L 1/0045; H04L 1/1819; H04L 1/1829; H04L 1/1867; H04L 1/004; H04L 1/1671; H04L 1/1864
See application file for complete search history.

(56) References Cited

U.S. PATENT DOCUMENTS

| | | | |
|---|---|---|---|
| 9,294,221 B2* | 3/2016 | Manssour | H04L 1/1867 |
| 10,333,653 B2* | 6/2019 | Wakabayashi | H04L 1/08 |
| 2011/0022918 A1 | 1/2011 | Kwon et al. | |
| 2011/0138260 A1 | 6/2011 | Savin | |
| 2014/0040214 A1 | 2/2014 | Ma et al. | |
| 2020/0028522 A1* | 1/2020 | Hui | H03M 13/3776 |

FOREIGN PATENT DOCUMENTS

| | | |
|---|---|---|
| CN | 105227189 A | 1/2016 |
| CN | 105743621 A | 7/2016 |
| GN | 102474399 A | 5/2012 |
| WO | 2015006947 A1 | 1/2015 |

OTHER PUBLICATIONS

Supplementary European Search Report—EP17875221—Search Authority—Munich—dated Jun. 18, 2020.
Zte et al., "HARQ Performance of Rate-Compatible Polar Codes," 3GPP Draft, 3GPP TSG-RAN WG1 #87, R1-1613267 HARQ Performance of Rate-Compatible Polar Codes, 3rd Generation Partnership Project (3GPP), Mobile Competence Centre, 650, Route Des Lucioles, F-06921 Sophia-Antipolis Cedex, vol. RAN WG1, No. Reno, US; Nov. 14, 2016-Nov. 18, 2016, Nov. 19, 2016, XP051191139, 8 Pages, Retrieved from the Internet: URL: http://www.3gpp.org/ftp/tsg_ran/WG1_RL1/TSGR1_87/Docs/ [retrieved on Nov. 19, 2016], section 3.
International Search Report and Written Opinion—PCT/CN2016/107944—ISA/EPO—dated Aug. 16, 2017.
International Search Report and Written Opinion—PCT/CN2017/086985—ISA/EPO—dated Jul. 26, 2017.
ZTE: ZTE Micro Electronics, "Discussion on Polar Codes for NR", 3GPP TSG RAN WG #86 R1-166415, Aug. 26, 2016, 9 Pages.

* cited by examiner

600

| 3 Tx | X1 Half | X2 Half |

| 4 Tx | X1- X1 Half | X2-X2 Half |

FIG. 7

TECHNIQUES FOR REDUNDANCY GENERATION OF POLAR CODES DURING WIRELESS COMMUNICATIONS

CLAIM OF PRIORITY

The present application for patent claims priority to International Patent Application No. PCT/CN2016/107944 entitled "TECHNIQUES FOR REDUNDANCY GENERATION OF POLAR CODES DURING WIRELESS COMMUNICATIONS" filed Nov. 30, 2016, which is assigned to the assignee hereof and hereby expressly incorporated by reference herein.

BACKGROUND

Aspects of this disclosure relate generally to wireless communication networks, and more particularly to techniques for redundancy generation of polar codes during wireless communications.

Wireless communication networks are widely deployed to provide various telecommunication services such as telephony, video, data, messaging, and broadcasts. Typical wireless communication networks may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems.

These multiple access technologies have been adopted in various telecommunication standards to provide a common protocol that enables different wireless devices to communicate on a municipal, national, regional, and/or even global level. For example, fifth generation (5G) New Radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G communications technology and beyond. Preferably, these improvements should be applicable to other multi-access technologies and the telecommunication standards that employ these technologies.

As the number of packets being transmitted increases with 5G, techniques are needed to provide efficient and improved process when communicating frames during wireless communications. In certain instances, as the next generation of wireless communications come into existence, more flexible transmissions may be desired in order to ensure adequate or improved levels of wireless communications. Thus, improvements in communication during wireless communication are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method includes redundancy generation of polar codes during wireless communications. The described aspects include determining that a second transmission is decoded incorrectly in response to a first received indication on a communication channel. The described aspects further include transmitting, on the communication channel, a third transmission and a fourth transmission based on a determination that the second transmission is decoded incorrectly, wherein the third transmission corresponds to a coded bit set of the third transmission including a first group of information bits of a coded bit set of a first transmission and a second group of information bits of a coded bit set of the second transmission and the fourth transmission corresponds to a coded bit set of the fourth transmission including a combination of the coded bit sets of the first transmission, the second transmission, and the third transmission.

In an aspect, an apparatus for redundancy generation of polar codes during wireless communications may include a memory, and a processor communicatively coupled to the memory and configured to determine that a second transmission is decoded incorrectly in response to a first received indication on a communication channel. The described aspects further transmit, on the communication channel, a third transmission and a fourth transmission based on a determination that the second transmission is decoded incorrectly, wherein the third transmission corresponds to a coded bit set of the third transmission including a first group of information bits of a coded bit set of a first transmission and a second group of information bits of a coded bit set of the second transmission and the fourth transmission corresponds to a coded bit set of the fourth transmission including a combination of the coded bit sets of the first transmission, the second transmission, and the third transmission.

In an aspect, a computer-readable medium may store computer executable code for redundancy generation of polar codes during wireless communications is described. The described aspects include code for determining that a second transmission is decoded incorrectly in response to a first received indication on a communication channel. The described aspects further include code for transmitting, on the communication channel, a third transmission and a fourth transmission based on a determination that the second transmission is decoded incorrectly, wherein the third transmission corresponds to a coded bit set of the third transmission including a first group of information bits of a coded bit set of a first transmission and a second group of information bits of a coded bit set of the second transmission and the fourth transmission corresponds to a coded bit set of the fourth transmission including a combination of the coded bit sets of the first transmission, the second transmission, and the third transmission.

In an aspect, an apparatus for redundancy generation of polar codes during wireless communications is described. The described aspects include means for determining that a second transmission is decoded incorrectly in response to a first received indication on a communication channel. The described aspects further include means for transmitting, on the communication channel, a third transmission and a fourth transmission based on a determination that the second transmission is decoded incorrectly, wherein the third transmission corresponds to a coded bit set of the third transmission including a first group of information bits of a coded bit set of a first transmission and a second group of information bits of a coded bit set of the second transmission and the fourth transmission corresponds to a coded bit set of the fourth transmission including a combination of the coded bit sets of the first transmission, the second transmission, and the third transmission.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein:

FIG. 6 is a conceptual diagram of an example third transmission in accordance with one or more aspects of the disclosure.

FIG. 7 is a conceptual diagram of an example fourth transmission in accordance with one or more aspects of the disclosure.

DETAILED DESCRIPTION

Figure 1:
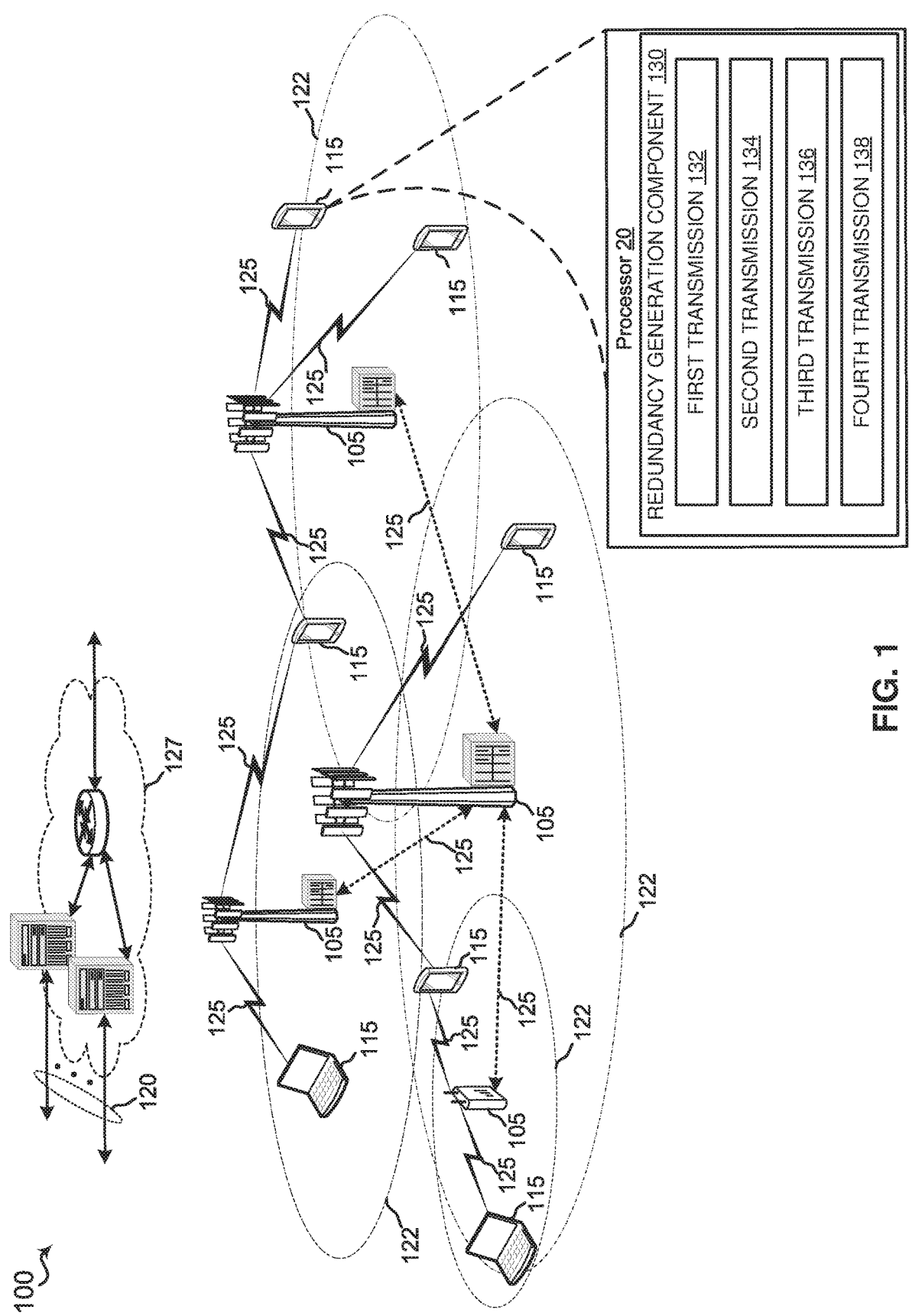
FIG. 1 is an example schematic diagram of a wireless communication network including at least one UE having a redundancy generation component configured to perform redundancy generation of polar codes during wireless communications in accordance with one or more aspects of the disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

The present aspects generally relate to a redundancy generation for polar codes during wireless communications. Specifically, conventional implementations may be unsuited for facilitating communications between user equipments (UEs) and network entities using polar codes. For example, a polar code corresponds to a linear block error correcting code. As further described in FIG. 3, the encoder structure of the polar codes are generated such that the sub-channels of a communication channel are allocated into two or more subsets (e.g., the best sub-channels and the worst sub-channels) based on the error probability of each sub-channel. In general, polar codes are utilized to achieve a channel capacity for symmetric binary-input discrete memoryless channels. Moreover, a hybrid automatic repeat request (HARQ) scheme is used during wireless communications to improve transmission efficiency. Using HARQ, one or more coded blocks may be retransmitted if a first transmission is not decoded correctly. As such, improvements are needed corresponding to the performance during channel fading and to reduce the cyclic redundancy check (CRC) overhead.

Accordingly, in some aspects, the present methods and apparatuses may provide an efficient solution, as compared to conventional solutions, by generating the redundancy version of polar codes with HARQ during wireless communications. In the present aspects, a UE may efficiently and effectively determine that a second transmission is decoded incorrectly in response to a first received indication on a communication channel. Further, the present aspects provide one or more mechanisms for transmitting, on the communication channel, a third transmission and a fourth transmission based on a determination that the second transmission is decoded incorrectly, wherein the third transmission corresponds to a coded bit set of the third transmission including a first group of information bits of a coded bit set of a first transmission and a second group of information hits of a coded bit set of the second transmission and the fourth transmission corresponds to a coded bit set of the fourth transmission including a combination of the coded bit sets of the first transmission, the second transmission, and the third transmission.

Referring to FIG. 1, in accordance with various aspects of the present disclosure, an example of a wireless communication network 100 which includes at least one UE 115 with a processor 20 having redundancy generation component 130 configured to perform redundancy generation of polar codes during wireless communications in a new radio wireless communication system.

In an aspect, UE 115 may execute redundancy generation component 130 to determine that a second transmission 134 is decoded incorrectly in response to a first received indication on a communication channel (e.g., communication link 125). The UE 115 may execute redundancy generation component 130 to transmit, on the communication channel, a third transmission 136 and a fourth transmission 138 based on a determination that the second transmission 134 is decoded incorrectly. For example, the third transmission 136 corresponds to a coded bit set of the third transmission 136 including a first group of information bits of a coded bit set of a first transmission 132 and a second group of information bits of a coded bit set of the second transmission 134 and the fourth transmission 138 corresponds to a coded bit set of the fourth transmission 138 including a combination of the coded bit sets of the first transmission 132, the second transmission 134, and the third transmission 136.

The wireless communication network 100 may include one or more base stations 105, one or more UEs 115, and a core network 127. The core network 127 may provide user authentication, access authorization, tracking, internet protocol (IP) connectivity, and other access, routing, or mobility functions. The base stations 105 may interface with the core network 127 through backhaul links 120 (e.g., S1, etc.). The base stations 105 may perform radio configuration and scheduling for communication with the UEs 115, or may operate under the control of a base station controller (not shown). In various examples, the base stations 105 may communicate, either directly or indirectly (e.g., through core network 127), with one another over backhaul links 120 (e.g., X1, etc.), which may be wired or wireless communication links.

The base stations 105 may wirelessly communicate with the UEs 115 via one or more base station antennas. Each of the base stations 105 may provide communication coverage for a respective geographic coverage area 122. In some examples, base stations 105 may be referred to as a base transceiver station, a radio base station, an access point, an access node, a radio transceiver, a NodeB, eNodeB (eNB), gNodeB (gNB). Home NodeB, a Home eNodeB, a relay, or some other suitable terminology. The geographic coverage area 122 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4O)/LTE, 3G. Wi-Fi, Bluetooth, etc.), and thus there may be overlapping geographic coverage areas 122 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 115. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 115 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 115 with service subscriptions with the network provider. A femto cell may also cover a small geographic area (e.g., a home) and may provide restricted access and/or unrestricted access by the UEs 115 having an association with the femto cell (e.g., in the restricted access case, the UEs 115 in a closed subscriber group (CSG) of the base station 105, which may include the UEs 115 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC). MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 115 and the base station 105. The RRC protocol layer may also be used for core network 127 support of radio bearers for the user plane data. At the physical (PHY) layer, the transport channels may be mapped to physical channels.

The UEs 115 may be dispersed throughout the wireless communication network 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 115 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 115 may be able to communicate with various types of base stations 105 and network equipment including macro eNBs, small cell eNBs, macro gNBs, small cell gNBs, relay base stations, and the like.

The UE 115 may be configured to establish one or more wireless communication links 125 with one or more base stations 105. The wireless communication links 125 shown in wireless communication network 100 may carry uplink (UL) transmissions from a UE 115 to a base station 105, or downlink (DL) transmissions, from a base station 105 to a UE 115. The downlink transmissions may also be called forward link transmissions while the uplink transmissions may also be called reverse link transmissions. Each wireless communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 125 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 125 may represent one or more broadcast channels.

In some aspects of the wireless communication network 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers. The base stations 105 and UEs 115 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105 operating according to Wi-Fi technology. e.g., Wi-Fi access points, in communication with UEs 115 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 115 may operate according to a NR or 5G technology referred to as millimeter wave (mmW or mmwave or MMW) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 115 operating according to the mmW technology may utilize beamforming in their transmissions to compensate for the extremely high path loss and short range.

Figure 2:
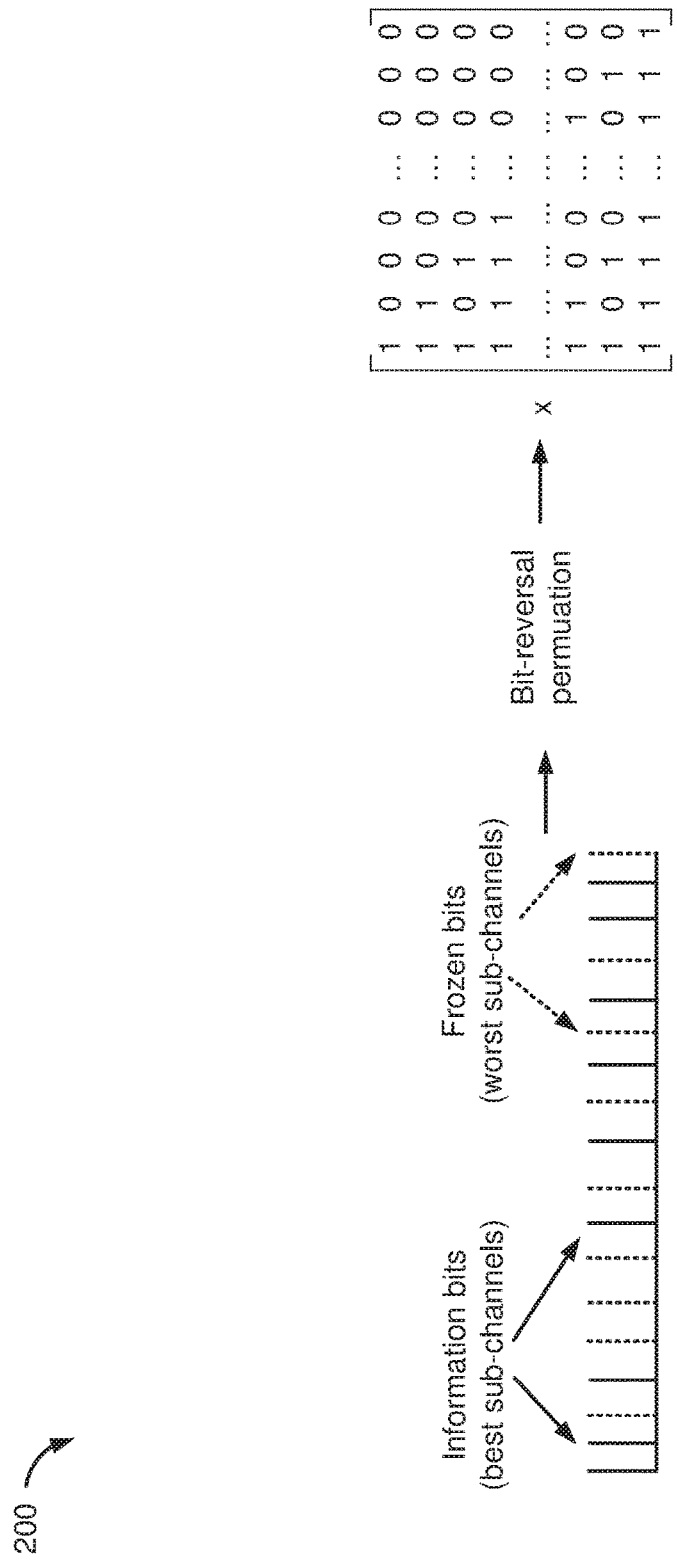
FIG. 2 is a conceptual diagram of an example of an encoder structure for polar codes in accordance with one or more aspects of the disclosure.

FIG. 2 is a conceptual diagram of a encoder structure 200 an encoder for polar codes during wireless communications between a network entity, such as network entity 105 (FIG. 1), to a UE, such as UE 115 (FIG. 1), executing a redundancy generation component 130 in accordance with one or more aspects. For example, the encoder structure of the polar codes are constructed such that the sub-channels of a communication channel are allocated into two or more subsets (e.g., the best sub-channels and the worst sub-channels) based on the error probability of each sub-channel. The information bits are placed on the best sub-channels while the frozen bits with zero values are placed on the worst sub-channels. Bit-reversal permutation is performed such that the output bits of the decoder are in sequence. After bit-reversal permutation and encoding procedure, a coded block is obtained. The encoding is performed after multiplying the Hadamard matrix. The generator matrices of polar codes are comprised of the rows of Hadamard matrix. The rows corresponding to low error probabilities of a successive cancellation decoder are selected for information bits while the left rows are selected for frozen bits.

Figure 3:
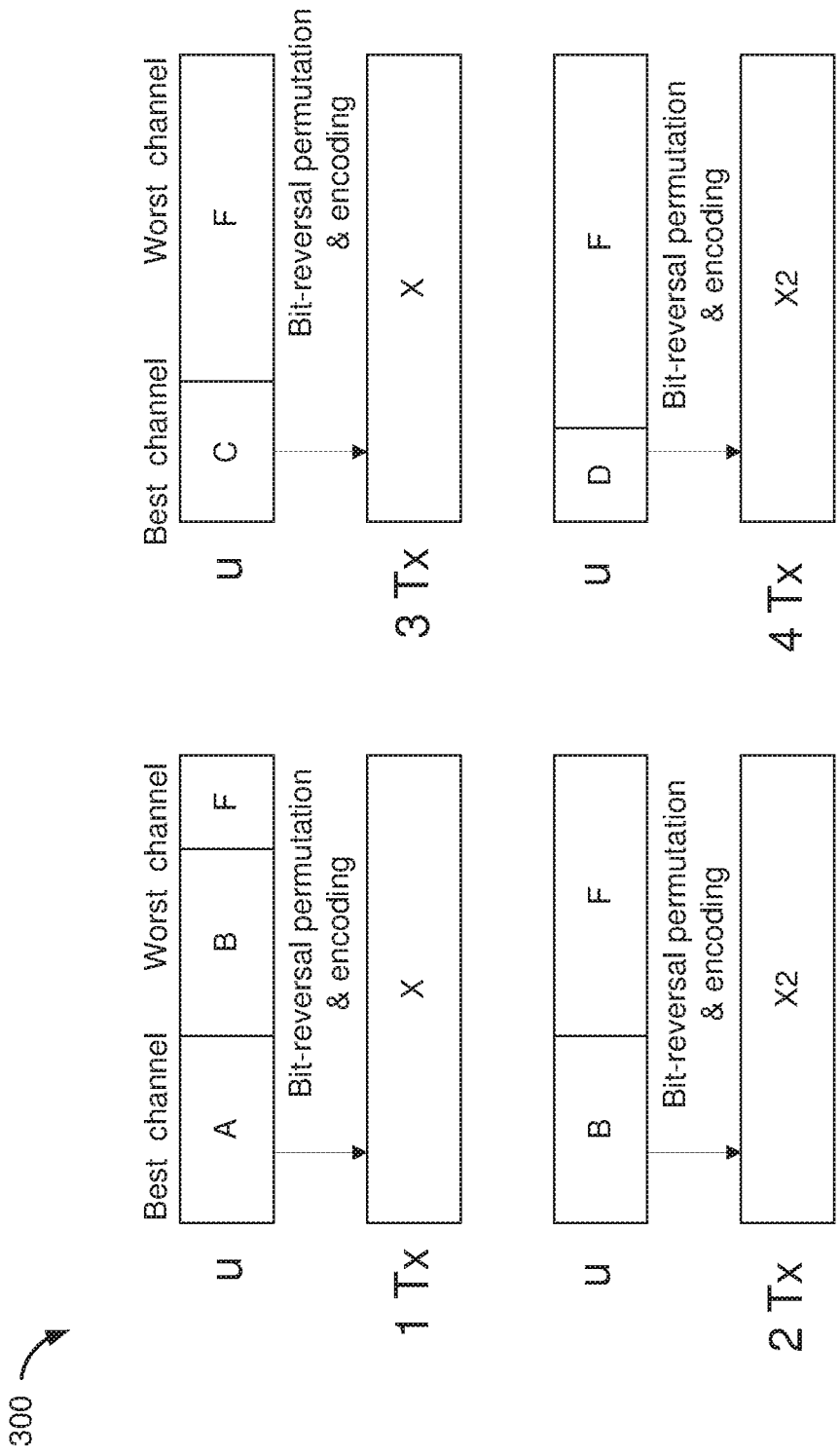
FIG. 3 is a conceptual diagram of an example of a transmission scheme for polar codes in accordance with one or more aspects of the disclosure.

FIG. 3 is a conceptual diagram of a transmission scheme 300 for polar codes during wireless communications between a network entity, such as network entity 105 (FIG. 1), to a UE, such as UE 115 (FIG. 1), executing a redundancy generation component 130 in accordance with one or more aspects. For example, transmission scheme 300 may correspond to a HARQ-incremental redundancy (HARQ-IR) scheme for polar codes. In the u domain of the first transmission, the information bits may be allocated into two sub-blocks denoted as A and B. The F block is for frozen bits with values of zero. After bit-reversal permutation and encoding procedure, the coded block in X domain is obtained. If the first transmission is decoded correctly in a receiver, the transmission ends. However, if the first transmission is not decoded correctly by a receiving entity (e.g., a network entity), a new codeword with B information bits will be generated and transmitted. If B in the second transmission is decoded correctly, then the B information bits in the first transmission will be set as frozen bits and the A information bits in the first transmission will be decoded accordingly. In this example, it may be possible to obtain the low rate for A in the first transmission. Thus, transmission scheme for the first transmission and the second transmission is equivalent to the conventional HARQ-IR scheme in terms of coding gain.

In a further aspect, for the third transmission and the fourth transmission, the information bits in blocks C and D are selected from blocks A and B. In an example, the block sizes of blocks C and D are less than (e.g., about ⅓ and ¼) of the block sizes of A and B. Therefore, the CRC overhead may be relatively large for the third transmission and the fourth transmission. In addition, the performance of the third transmission and the fourth transmission may not be optimal for a fading channel because channel diversity is not obtained.

Figure 4:
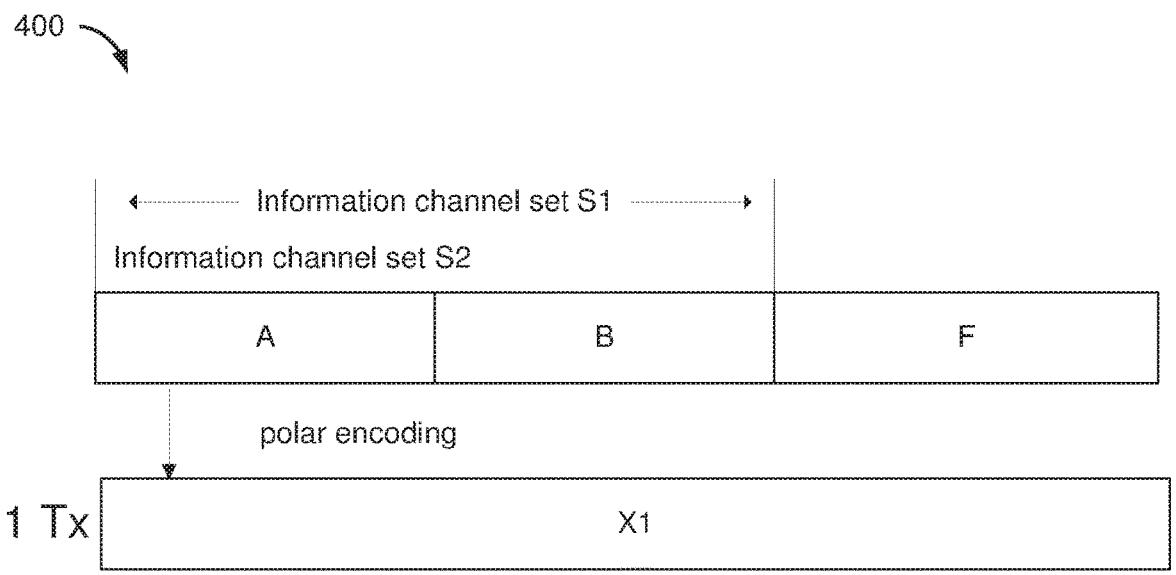
FIG. 4 is a conceptual diagram of an example first transmission in accordance with one or more aspects of the disclosure.

FIG. 4 is a conceptual diagram of an example of a first transmission 400 in accordance with one or more aspects. For example, the first transmission 400 may correspond to first transmission 132 (FIG. 1). Further, a UE, such as UE 115 (FIG. 1), and/or redundancy generation component 130 may execute transceiver 60 to transmit, on a communication channel 125, the first transmission 400. In some aspects, the first transmission 400 corresponds to a first group of polar codes including a first code block length and a first number of information bits of a first channel set. In particular, information bits may be allocated into two sub-blocks denoted as A and B. These information bits may correspond to information channel set $S_1$. The F block is for frozen bits with values of zero. After a polar encoding procedure, the coded block with a coded bit set (e.g., $X_1$) of the first transmission 500 is obtained.

Figure 5:
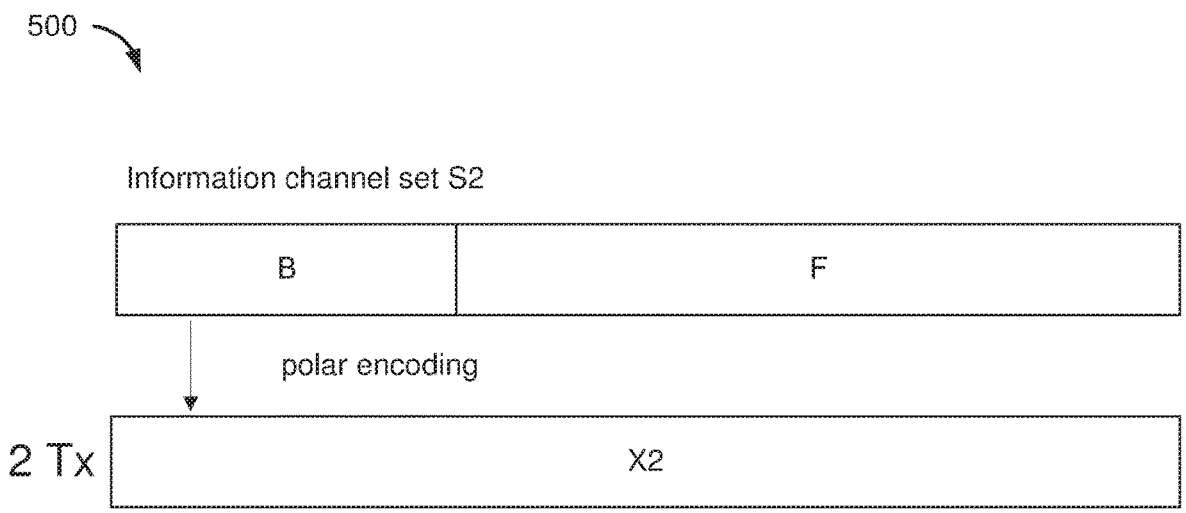
FIG. 5 is a conceptual diagram of an example second transmission in accordance with one or more aspects of the disclosure.

FIG. 5 is a conceptual diagram of an example of a second transmission 500 in accordance with one or more aspects. For example, the second transmission 500 may correspond to second transmission 134 (FIG. 1). Further, a UE, such as UE 115 (FIG. 1), and/or redundancy generation component 130 may execute transceiver 60 to transmit, on a communication channel 125, the second transmission 500. In some aspects, the second transmission 500 corresponds to a second group of polar codes including a second code block length and a second number of information bits of a second channel set. In particular, information bits may be allocated into a sub-block denoted as B. These information bits may correspond to information channel set $S_2$. The F block is for frozen bits with value of zeros. After a polar encoding procedure, the coded block with a coded bit set (e.g., $X_2$) of the second transmission 500 is obtained.

FIG. 6 is a conceptual diagram of an example of a third transmission 600 in accordance with one or more aspects. For example, the third transmission 600 may correspond to third transmission 136 (FIG. 1). Further, a UE, such as UE 115 (FIG. 1), and/or redundancy generation component 130 may execute transceiver 60 to transmit, on a communication channel 125, the third transmission 600. In some aspects, the third transmission 600 corresponds to a coded bit set (e.g., $X_3$) of the third transmission 600 including a first group of information bits of a coded bit set (e.g., $X_1$) of a first transmission 500 and a second group of information bits of a coded bit set (e.g., $X_2$) of the second transmission 600. In an example, the coded bit set (e.g., $X_3$) of the third transmission 600 may include a combination of half of the information bits of a coded bit set (e.g., $X_1$) of a first transmission 400 and half of the information bits of a coded bit set (e.g., $X_2$).

FIG. 7 is a conceptual diagram of an example of a fourth transmission 700 in accordance with one or more aspects. For example, the fourth transmission 700 may correspond to fourth transmission 138 (FIG. 1). Further, a UE, such as UE 115 (FIG. 1), and/or redundancy generation component 130 may execute transceiver 60 to transmit, on a communication channel 125, the fourth transmission 700. In some aspects, the fourth transmission 700 corresponds to a coded bit set (e.g., $X_4$) of the fourth transmission 138 including a combination of the coded bit sets of the first transmission 400 (e.g., $X_1$), the second transmission 500 (e.g., $X_2$), and the third transmission 600 (e.g., $X_3$). In an example, the combination of the coded bit sets of the first transmission 400, the second transmission 500, and the third transmission 600 corresponds to a difference between a summation of the coded bit sets of the first transmission 400 and the second transmission 500 and the coded bit set of the third transmission 600 (e.g., $X_4=X_1+X_2-X_3$). As such, the disclosed transmission scheme of redundancy generation provides for better performance and is more robust under fading channel conditions.

Figure 8:
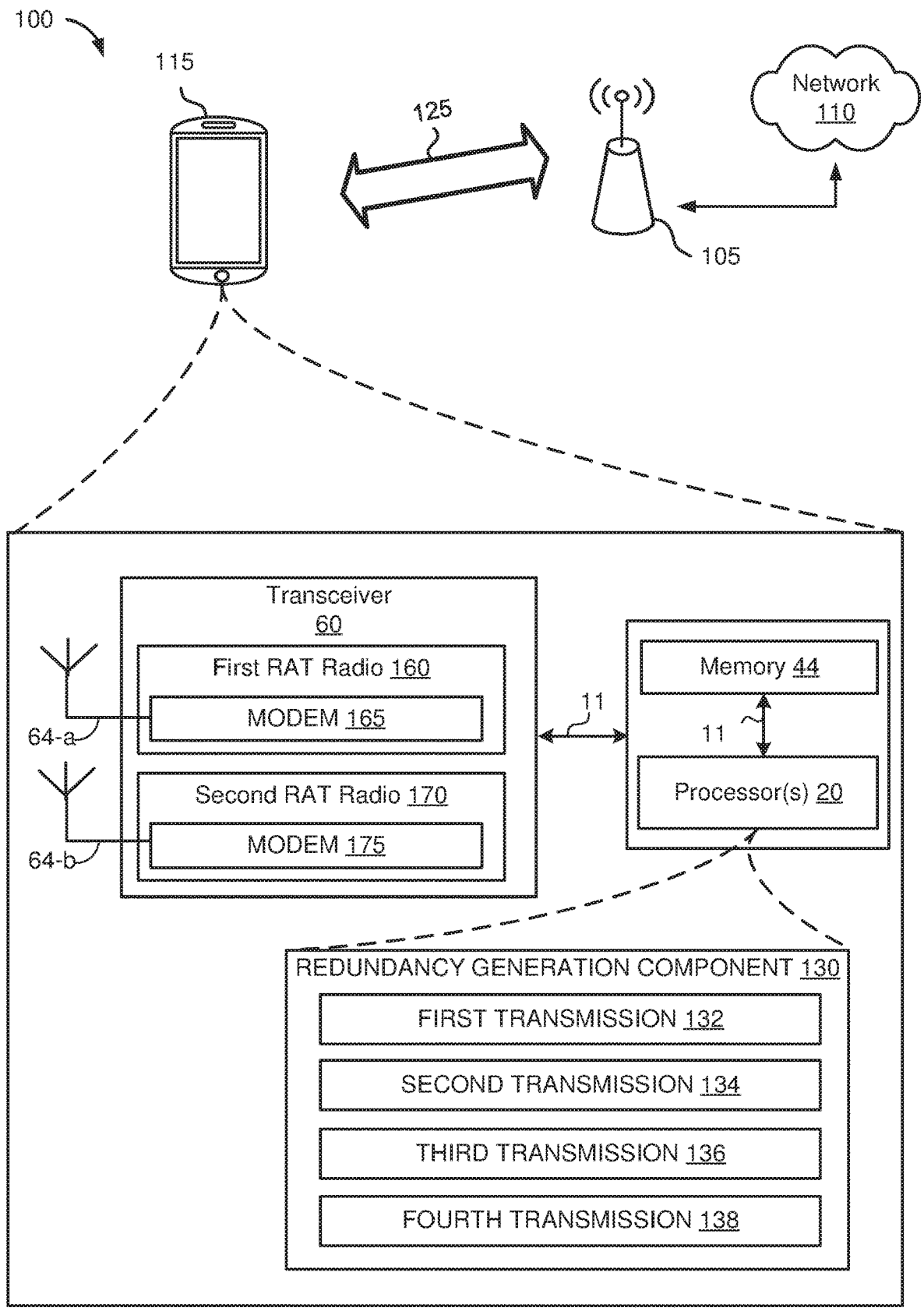
FIG. 8 is an example schematic diagram of a wireless communication network including an aspect of a redundancy generation component for wireless communications in accordance with one or more aspects.

Referring to FIG. 8, in an aspect, a wireless communication system 100 includes at least one user equipment (UE) 115 in communication coverage of at least one network entity 105. The UE 115 may communicate with a network 110 via the network entity 105. In an example, the UE 115 may transmit and/or receive wireless communication to and/or from the network entity 105 via one or more communication channels 125. The one or more communication channels 125 may include an uplink communication channel (or simply uplink channel bandwidth region) for transmission of data from the UE 115 to the network entity 105 and a downlink communication channel (or simply downlink channel bandwidth region) for transmission of data from the network entity 105 to the UE 115, such as but not limited to an uplink data channel and/or downlink data channel. Such wireless communications may include, but are not limited to, data, audio and/or video information. Moreover, in an example, the wireless communications between the UE 115 and the network entity 105 may include 5G new radio (NR) communications.

In accordance with the present disclosure, the UE 115 may include a memory 44, one or more processors 20 and a transceiver 60. The memory 44, one or more processors 20 and the transceiver 60 may communicate internally via a bus 11. In some examples, the memory 44 and the one or more processors 20 may be part of the same hardware component (e.g., may be part of a same board, module, or integrated circuit). Alternatively, the memory 44 and the one or more processors 20 may be separate components that may act in conjunction with one another. In some aspects, the bus 11 may be a communication system that transfers data between multiple components and/or subcomponents of the UE 115. In some examples, the one or more processors 20 may include any one or combination of modem processor, baseband processor, digital signal processor and/or transmit processor, or any other processor that may, for example, receive, on a downlink channel from a network entity (e.g., network entity 105), a first transmission, and transmit, on an uplink channel, the second transmission to a network entity.

Additionally or alternatively, the one or more processors 20 may include a redundancy generation component 130 for carrying out one or more methods or procedures described herein. In an aspect, the term "component" as used herein may be one of the parts that make up a system, may be hardware, firmware, and/or software, and may be divided into other components. The redundancy generation component 130, and each of its subcomponents, may comprise hardware, firmware, and/or software and may be configured to execute code or perform instructions stored in a memory (e.g., a computer-readable storage medium).

In some examples, the UE 115 may include the memory 44, such as for storing data used herein and/or local versions of applications or communication with redundancy generation component 130 and/or one or more of its subcomponents being executed by the one or more processors 20. The memory 44 can include any type of computer-readable medium usable by a computer or processor 20, such as random access memory (RAM), read only memory (ROM), tapes, magnetic discs, optical discs, volatile memory, non-volatile memory, and any combination thereof. In an aspect, for example, the memory 44 may be a computer-readable storage medium (e.g., a non-transitory medium) that stores one or more computer-executable codes defining redundancy generation component 130 and/or one or more of its subcomponents, and/or data associated therewith, when the UE 115 is operating one or more processors 20 to execute the redundancy generation component 130 and/or one or more of its subcomponents. In some examples, the UE 115 may further include a transceiver 60 for transmitting and/or receiving one or more data and control signals to/from the network via the network entity 105. The transceiver 60 may comprise hardware, firmware, and/or software and may be configured to execute code or perform instructions stored in a memory (e.g., a computer-readable storage medium). The transceiver 60 may include a first radio access technology (RAT) radio 160 (e.g. UMTS/WCDMA, LTE-A, WLAN, Bluetooth, WSAN-FA) comprising a modem 165 (e.g., a first modem), and, optionally, a second RAT radio 170 (e.g., 5G) comprising a modem 175 (e.g., a second modem). The first RAT radio 160 and second RAT radio 170 may utilize one or more antennas 64*a* and 64-*b* for transmitting signals to and receiving signals from the network entity 105. In some examples, the transceiver 60 may include one of the first RAT radio 160 and/or the second RAT radio 170.

In an aspect, the UE 115 may include the redundancy generation component 130, which may be configured to determine that a second transmission 134 is decoded incorrectly in response to a first received indication of a transmission error of a previous transmission on the communication channel 125. In some aspects, the UE 115 may transmit, on the communication channel 125, the first transmission 132 based on a second received indication of a transmission error of a previous transmission and transmit, on the communication channel 125, the second transmission 134 based on a third received indication that the first transmission 132 is decoded incorrectly. For example, the first transmission 132 corresponds to a first group of polar codes including a first code block length and a first number of information bits of a first channel set and the second transmission 134 corresponds to a second group of polar codes including a second code block length and a second number of information bits of a second channel set. In an example, the second number of information bits differs from the first number of information bits.

In an aspect, UE 115 and/or redundancy generation component 130 may execute transceiver 60 to transmit a transmission, on the communication channel 125, a third transmission 136 and a fourth transmission 138 based on a determination that the second transmission 134 is decoded incorrectly. In an example, the third transmission 136 corresponds to a coded bit set of the third transmission 136 including a first group of information bits of a coded bit set of a first transmission 132 and a second group of information bits of a coded bit set of the second transmission 134 and the fourth transmission 138 corresponds to a coded bit set of the fourth transmission 138 including a combination of the coded bit sets of the first transmission 132, the second transmission 134, and the third transmission 136.

In some aspects, the first group of information bits corresponds to a first half of the coded bit set of the first transmission 132 and the second group of information bits corresponds to a first half of the coded bit set of the second transmission 134. Furthermore, the combination of the coded bit sets of the first transmission 132, the second transmission 134, and the third transmission 136 corresponds to a difference between a summation of the coded bit sets of the first transmission 132 and the second transmission 134 and the coded bit set of the third transmission 136. Moreover, the communication channel 125 may corresponds to a 5G NR communication channel.

The UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. The UE 115 may be able to communicate with macro eNodeBs, small cell eNodeBs, relays, and the like. The UE 115 may also be able to communicate over different access networks, such as cellular or other WWAN access networks, or WLAN access networks.

Additionally, as used herein, the one or more wireless nodes or wireless serving nodes, including, but not limited to, network entity 105 of wireless communication system 100, may include one or more of any type of network component, such as an access point, including a base station or node B, an eNodeB a relay, a peer-to-peer device, an authentication, authorization and accounting (AAA) server, a mobile switching center (MSC), a radio network controller (RNC), etc. In a further aspect, the one or more wireless serving nodes of wireless communication system 100 may include one or more macro and/or small cell base stations, such as, but not limited to a femtocell, picocell, microcell, or any other base station having a relatively small transmit power or relatively small coverage area as compared to a macro base station.

Figure 9:
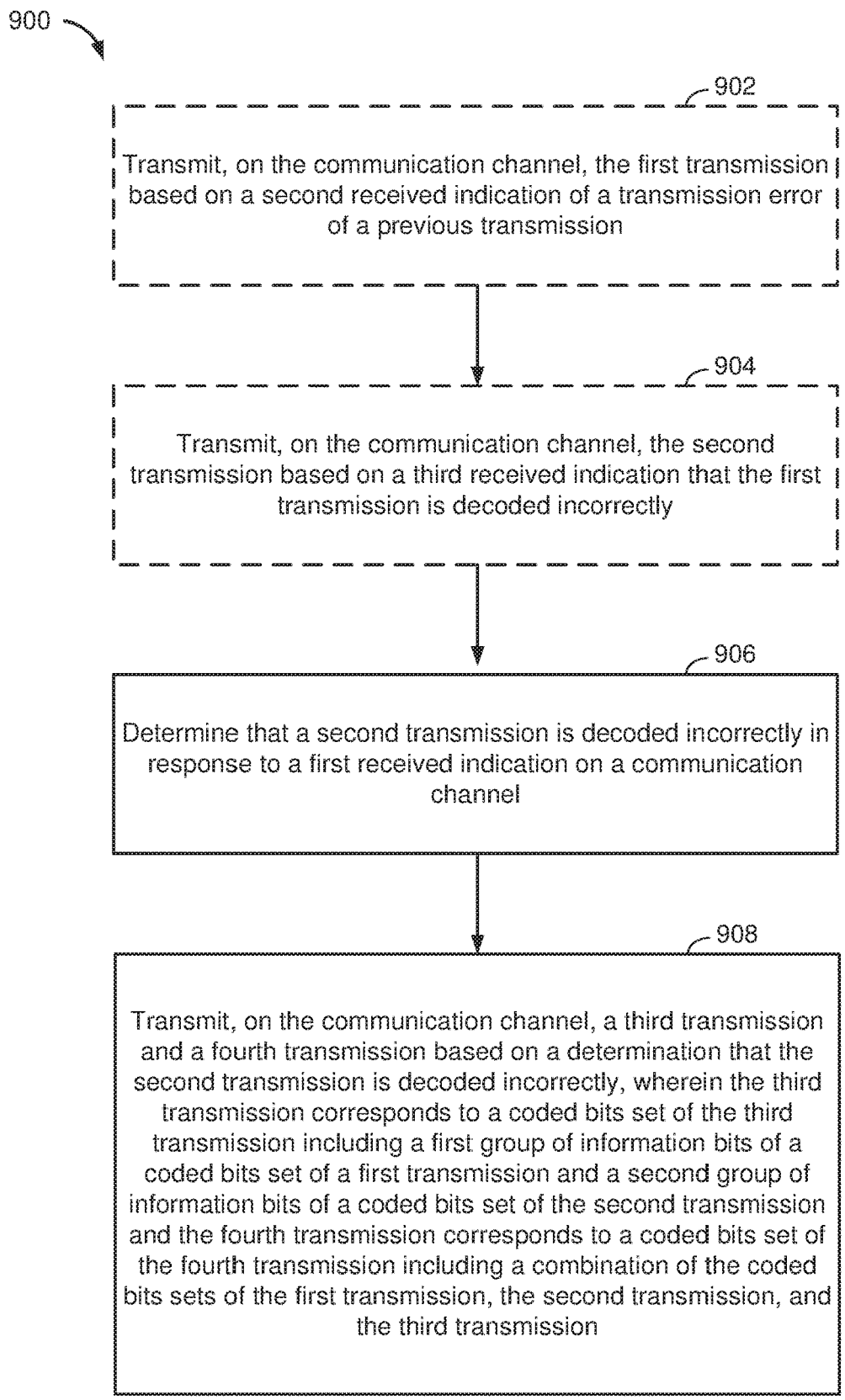
FIG. 9 is a flow diagram illustrating an example of a method of communications in a wireless communication system in accordance with one or more aspects of the disclosure.

FIG. 9 is a flow diagram illustrating examples of a method 900 related to redundancy generation of polar codes during wireless communications in accordance with various aspects of the present disclosure. Although the operations described below are presented in a particular order and/or as being performed by an example component, it should be understood that the ordering of the actions and the components performing the actions may be varied, depending on the implementation. Also, although the redundancy generation component 130 (FIG. 8) is illustrated as having a number of subcomponents, it should be understood that one or more of the illustrated subcomponents may be separate from, but in communication with, the redundancy generation component 130 (FIG. 8), and/or each other. Moreover, it should be understood that any of actions or components described below with respect to the redundancy generation component 130 (FIG. 8) and/or its subcomponents may be performed by a specially-programmed processor, such as processor 20 (FIG. 8), a processor executing specially-programmed software or computer-readable media, or by any other combination of a hardware component and/or a software component specially configured for performing the described actions or components.

In an aspect, at block 902, the method 900 may transmit, on the communication channel, the first transmission based on a second received indication of a transmission error of a previous transmission. In an aspect, for example, the UE 115 and/or redundancy generation component 130 may execute transceiver 60 (FIG. 8) to transmit, on the communication channel 125, the first transmission 132 based on a second received indication of a transmission error of a previous transmission.

In aspect, at block 904, the method 900 may transmit, on the communication channel, the second transmission based on a third received indication that the first transmission is decoded incorrectly. In an aspect, for example, the UE 115 and/or redundancy generation component 130 may execute transceiver 60 (FIG. 8) to transmit, on the communication channel 125, the second transmission 134 based on a third received indication that the first transmission 132 is decoded incorrectly.

In some aspects, transmitting at least the first transmission 132 and second transmission 134 further comprises transmitting at least the first transmission 132 and second transmission 134 using a HARQ-IR scheme for one or more polar codes.

In an aspect, at block 906, the method 900 may determine that a second transmission is decoded incorrectly in response to a first received indication on a communication channel. In an aspect, for example, the UE 115 (FIG. 8) may execute redundancy generation component 130 (FIG. 8) to determine that a second transmission 134 is decoded incorrectly in response to a first received indication on a communication channel 125.

In some aspects, the first transmission 132 corresponds to a first group of polar codes including a first code block length and a first number of information bits of a first channel set and the second transmission 134 corresponds to a second group of polar codes including a second code block length and a second number of information bits of a second channel set. In an example, the second number of information bits differs from the first number of information bits.

In an aspect, at block 908, the method 900 may transmit, on the communication channel, a third transmission and a fourth transmission based on a determination that the second transmission is decoded incorrectly. In an aspect, for example, the UE 115 and/or redundancy generation component 130 may execute transceiver 60 (FIG. 8) to transmit, on the communication channel 125, a third transmission 136 and a fourth transmission 138 based on a determination that the second transmission 134 is decoded incorrectly. In an example, the third transmission 136 corresponds to a coded bit set of the third transmission 136 including a first group of information bits of a coded bit set of a first transmission 132 and a second group of information bits of a coded bit set of the second transmission 134 and the fourth transmission 138 corresponds to a coded bit set of the fourth transmission 138 including a combination of the coded bit sets of the first transmission 132, the second transmission 134, and the third transmission 136.

In some aspects, the first group of information bits corresponds to a first half of the coded bit set of the first transmission 132 and the second group of information bits corresponds to a first half of the coded bit set of the second transmission 134.

In some aspects, the combination of the coded bit sets of the first transmission 132, the second transmission 134, and the third transmission 136 corresponds to a difference between a summation of the coded bit sets of the first transmission 132 and the second transmission 134 and the coded bit set of the third transmission 136.

In some aspects, the communication channel 125 corresponds to a 5G NR communication channel.

In some aspects, the coded bit set of the first transmission 132 and the coded bit set of the second transmission 134 are generated based at least on a bit-reversal permutation and encoding procedure.

In some aspects, UE 115 may execute redundancy generation component 130 to perform the bit-reversal permutation and encoding procedure using one or more of the first group of information bits, second group of information bits, and a group of frozen bits.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second." and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory. ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the disclosure can include a computer readable medium embodying a method for dynamic bandwidth management for transmissions in unlicensed spectrum. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of wireless communication at a user equipment (UE), comprising:
    determining that a second transmission is decoded incorrectly in response to a first received indication on a communication channel; and
    transmitting, on the communication channel, a third transmission and a fourth transmission based on a determination that the second transmission is decoded incorrectly, wherein the third transmission corresponds to a coded bit set of the third transmission including a first group of information bits of a coded bit set of a first transmission and a second group of information bits of a coded bit set of the second transmission and the fourth transmission corresponds to a coded bit set of the fourth transmission including a combination of the coded bit sets of the first transmission, the second transmission, and the third transmission, and wherein at least the first transmission and second transmission are transmitted using a hybrid automatic repeat request-incremental redundancy (HARQ-IR) scheme for one or more polar codes, and wherein the first group of information bits corresponds to a first half of the coded bit set of the first transmission and the second group of information bits corresponds to a first half of the coded bit set of the second transmission, and wherein the combination of the coded bit sets of the first transmission, the second transmission, and the third transmission corresponds to a difference between a summation of the coded bit sets of the first transmission and the second transmission and the coded bit set of the third transmission.

2. The method of claim 1, further comprising:
    transmitting, on the communication channel, the first transmission based on a second received indication of a transmission error of a previous transmission; and
    transmitting, on the communication channel, the second transmission based on a third received indication that the first transmission is decoded incorrectly.

3. The method of claim 2, wherein the first transmission corresponds to a first group of polar codes including a first code block length and a first number of information bits and the second transmission corresponds to a second group of polar codes including a second code block length and a second number of information bits.

4. The method of claim 3, wherein the second number of information bits differs from the first number of information bits.

5. The method of claim 1, wherein the communication channel corresponds to a fifth generation (5G) new radio (NR) communication channel.

6. The method of claim 1, wherein the coded bit set of the first transmission and the coded bit set of the second transmission are generated based at least on a bit-reversal permutation and encoding procedure.

7. The method of claim 6, performing the bit-reversal permutation and encoding procedure using one or more of the first group of information bits, second group of information bits, and a group of frozen bits.

8. The method of claim 1, wherein an encoder structure of the one or more polar codes is constructed such that one or more subchannels of the communication channel are allocated into two or more subsets based on an error probability of each of the one or more sub channels.

9. An apparatus for wireless communications at a user equipment (UE), comprising:
    a memory configured to store instructions; and
    a processor communicatively coupled to the memory, wherein the processor is configured to execute the instructions to:
        determine that a second transmission is decoded incorrectly in response to a first received indication on a communication channel; and
        transmit, on the communication channel, a third transmission and a fourth transmission based on a determination that the second transmission is decoded incorrectly, wherein the third transmission corresponds to a coded bit set of the third transmission including a first group of information bits of a coded bit set of a first transmission and a second group of information bits of a coded bit set of the second transmission and the fourth transmission corresponds to a coded bit set of the fourth transmission including a combination of the coded bit sets of the first transmission, the second transmission, and the third transmission, and wherein at least the first transmission and second transmission are transmitted using a hybrid automatic repeat request-incremental redundancy (HARQ-IR) scheme for one or more polar codes, and wherein the first group of information bits corresponds to a first half of the coded bit set of the first transmission and the second group of information bits corresponds to a first half of the coded bit set of the second transmission, and wherein the combination of the coded bit sets of the first transmission, the second transmission, and the third transmission corresponds to a difference between a summation of the coded bit sets of the first transmission and the second transmission and the coded bit set of the third transmission.

10. The apparatus of claim 9, wherein the processor is further configured to:

transmit, on the communication channel, the first transmission based on a second received indication of a transmission error of a previous transmission; and transmit, on the communication channel, the second transmission based on a third received indication that the first transmission is decoded incorrectly.

11. The apparatus of claim 10, wherein the first transmission corresponds to a first group of polar codes including a first code block length and a first number of information bits and the second transmission corresponds to a second group of polar codes including a second code block length and a second number of information bits.

12. The apparatus of claim 11, wherein the second number of information bits differs from the first number of information bits.

13. The apparatus of claim 10, wherein the communication channel corresponds to a fifth generation (5G) new radio (NR) communication channel.

14. The apparatus of claim 10, wherein the coded bit set of the first transmission and the coded bit set of the second transmission are generated based at least on a bit-reversal permutation and encoding procedure.

15. The apparatus of claim 14, wherein the processor is further configured to perform the bit-reversal permutation and encoding procedure using one or more of the first group of information bits, second group of information bits, and a group of frozen bits.

16. The apparatus of claim 9, wherein an encoder structure of the one or more polar codes is constructed such that one or more subchannels of the communication channel are allocated into two or more subsets based on an error probability of each of the one or more sub channels.

17. A non-transitory computer-readable medium for wireless communications at a user equipment (UE), comprising code executable by one or more processors for:

determining that a second transmission is decoded incorrectly in response to a first received indication on a communication channel; and transmitting, on the communication channel, a third transmission and a fourth transmission based on a determination that the second transmission is decoded incorrectly, wherein the third transmission corresponds to a coded bit set of the third transmission including a first group of information bits of a coded bit set of a first transmission and a second group of information bits of a coded bit set of the second transmission and the fourth transmission corresponds to a coded bit set of the fourth transmission including a combination of the coded bit sets of the first transmission, the second transmission, and the third transmission, and wherein at least the first transmission and second transmission are transmitted using a hybrid automatic repeat request-incremental redundancy (HARQ-IR) scheme for one or more polar codes, and wherein the first group of information bits corresponds to a first half of the coded bit set of the first transmission and the second group of information bits corresponds to a first half of the coded bit set of the second transmission, and wherein the combination of the coded bit sets of the first transmission, the second transmission, and the third transmission corresponds to a difference between a summation of the coded bit sets of the first transmission and the second transmission and the coded bit set of the third transmission.

18. The non-transitory computer-readable medium of claim 17, further comprising code for:

transmitting, on the communication channel, the first transmission based on a second received indication of a transmission error of a previous transmission; and transmitting, on the communication channel, the second transmission based on a third received indication that the first transmission is decoded incorrectly.

19. The non-transitory computer-readable medium of claim 18, wherein the first transmission corresponds to a first group of polar codes including a first code block length and a first number of information bits of a first channel set and the second transmission corresponds to a second group of polar codes including a second code block length and a second number of information bits of a second channel set, and wherein the second number of information bits differs from the first number of information bits.

20. The non-transitory computer-readable medium of claim 17, wherein the communication channel corresponds to a fifth generation (5G) new radio (NR) communication channel.

21. The non-transitory computer-readable medium of claim 17, wherein an encoder structure of the one or more polar codes is constructed such that one or more subchannels of the communication channel are allocated into two or more subsets based on an error probability of each of the one or more subchannels.

22. An apparatus for wireless communications at a user equipment (UE), comprising:

means for determining that a second transmission is decoded incorrectly in response to a first received indication on a communication channel; and means for transmitting, on the communication channel, a third transmission and a fourth transmission based on a determination that the second transmission is decoded incorrectly, wherein the third transmission corresponds to a coded bit set of the third transmission including a first group of information bits of a coded bit set of a first transmission and a second group of information bits of a coded bit set of the second transmission and the fourth transmission corresponds to a coded bit set of the fourth transmission including a combination of the coded bit sets of the first transmission, the second transmission, and the third transmission, and wherein at least the first transmission and second transmission are transmitted using a hybrid automatic repeat request-incremental redundancy (HARQ-IR) scheme for one or more polar codes, and wherein the first group of information bits corresponds to a first half of the coded bit set of the first transmission and the second group of information bits corresponds to a first half of the coded bit set of the second transmission, and wherein the combination of the coded bit sets of the first transmission, the second transmission, and the third transmission corresponds to a difference between a summation of the coded bit sets of the first transmission and the second transmission and the coded bit set of the third transmission.

23. The apparatus of claim 22, further comprising:

means for transmitting, on the communication channel, the first transmission based on a second received indication of a transmission error of a previous transmission; and means for transmitting, on the communication channel, the second transmission based on a third received indication that the first transmission is decoded incorrectly.

24. The apparatus of claim 23, wherein the first transmission corresponds to a first group of polar codes including a first code block length and a first number of information bits and the second transmission corresponds to a second group of polar codes including a second code block length and a second number of information bits, and wherein the second number of information bits differs from the first number of information bits.

25. The apparatus of claim 22, wherein the communication channel corresponds to a fifth generation (5G) new radio (NR) communication channel.

26. The apparatus of claim 22, wherein an encoder structure of the one or more polar codes is constructed such that one or more subchannels of the communication channel are allocated into two or more subsets based on an error probability of each of the one or more sub channels.

* * * * *